US008286366B2

(12) United States Patent
Pittari et al.

(10) Patent No.: US 8,286,366 B2
(45) Date of Patent: Oct. 16, 2012

(54) APPARATUS AND PROCESS FOR DRYING PLASTIC MATERIAL FOR A MACHINE USED TO PRODUCE PLASTIC CONTAINERS

(75) Inventors: Giampietro Pittari, Crocetta Del Montello (IT); Matteo Zoppas, Conegliano (IT)

(73) Assignee: S.I.P.A. Societa' Industrializzazione Progettazione E Automazione S.p.A., Vittorio Veneto (IT)

( * ) Notice: Subject to any disclaimer, the term of this patent is extended or adjusted under 35 U.S.C. 154(b) by 1225 days.

(21) Appl. No.: 12/063,232

(22) PCT Filed: Aug. 7, 2006

(86) PCT No.: PCT/EP2006/065101
§ 371 (c)(1),
(2), (4) Date: Feb. 7, 2008

(87) PCT Pub. No.: WO2007/017484
PCT Pub. Date: Feb. 15, 2007

(65) Prior Publication Data
US 2010/0132211 A1 Jun. 3, 2010

(30) Foreign Application Priority Data
Aug. 9, 2005 (IT) .............................. RM2005A0437

(51) Int. Cl.
*F26B 3/34* (2006.01)

(52) U.S. Cl. ................ 34/265; 34/105; 34/202; 34/210; 34/218; 264/40.1; 264/538; 425/135; 425/540

(58) Field of Classification Search .................... 34/265, 34/80, 90, 105, 201, 202, 337, 413, 497, 34/210, 218; 264/40.1, 538; 425/135, 540
See application file for complete search history.

(56) References Cited

U.S. PATENT DOCUMENTS

| | | | |
|---|---|---|---|
| 4,996,779 A | 3/1991 | Nakagomi et al. | |
| 5,513,445 A | 5/1996 | Farrag et al. | |
| 5,543,186 A * | 8/1996 | Andersen et al. | 428/34.4 |
| 5,714,217 A * | 2/1998 | Andersen et al. | 428/34.5 |
| 7,926,197 B2 * | 4/2011 | Zoppas et al. | 34/90 |
| 2004/0173949 A1 | 9/2004 | Storione et al. | |
| 2006/0177575 A1* | 8/2006 | Takemoto et al. | 427/248.1 |
| 2010/0209290 A1* | 8/2010 | Cirri et al. | 422/22 |

FOREIGN PATENT DOCUMENTS

| | | | |
|---|---|---|---|
| JP | 63231908 A * | 9/1988 | |
| WO | WO 0056510 A | 9/2000 | |
| WO | WO 2007017484 A1 * | 2/2007 | |

* cited by examiner

*Primary Examiner* — Stephen M. Gravini
(74) *Attorney, Agent, or Firm* — Knobbe, Martens, Olson & Bear, LLP

(57) ABSTRACT

PET drying apparatus for a machine used to produce PET bottles, comprising a unit in which the raw plastic is dried, before the plastic melting process, in which the PET is heated by using microwave energy and the PET is dehumidified by the outflow of the vented air that is recovered after the blowing process.

12 Claims, 2 Drawing Sheets

APPARATUS AND PROCESS FOR DRYING PLASTIC MATERIAL FOR A MACHINE USED TO PRODUCE PLASTIC CONTAINERS

CROSS REFERENCE TO RELATED APPLICATIONS

This application claims the benefit and priority to and is a U.S. National Phase of PCT International Application Number PCT/EP2006/065101, filed on Aug. 7, 2006. This application claims the benefit and priority to Italian Application No. RM2005A000437 filed on Aug. 9, 2005. The disclosures of the above-referenced applications are hereby expressly incorporated by reference in their entirety.

FIELD OF THE INVENTION

The present invention relates to a plastic material drying apparatus for a machine used to produce plastic containers and the relative process.

PRIOR ART

Some of the most widely used processes for producing plastic containers, in particular by high-productivity machines used to produce bottles and jars made of PET or other thermoplastic polymers, are single-stage processes integrated in a single machine that performs a complete bottle production cycle. It starts with the raw plastic material, which usually consists of PET in granules, that is melted in order to perform the subsequent preform injection process. The preforms maintained at a suitable temperature are then transferred directly to the blow molds where the final container shapes are produced, usually by means of a stretch-blow process.

In the case of bottles made of PET, this material must be fed into the machine, in its raw state in granules or after being reground, and is highly hygroscopic, which means it is not particularly suitable for use in blow forming processes to produce good quality bottles. The PET granules must therefore be dried or dehumidified to reduce their moisture content. Plasticizing can only start when the PET has the correct properties, when the moisture content has been reduced to approximately 20-50 parts per thousand. The PET is dehumidified and heated simultaneously to bring it to the plasticizing temperature of approximately 170° C., after which it can be fed into the extruder. This part of the production process, which comprises the drying and plasticizing of the plastic, consumes a considerable amount of energy.

Downstream of the single-stage bottle production machine are the molds for producing the bottles by means of the stretch-blow process. In this part of the machine high-pressure compressed air is used to dilate the preforms to give them their definitive shape in the blow molds. Two-step blow molding processes, characterised by the rapid input of compressed air at two different pressures, the first of which is usually approximately 10 bar and the other approximately 40 bar, are known in the prior art.

A considerable amount of energy is used to produce the compressed air needed for blowing, especially in view of the high bottle production rates per hour that such machines now achieve.

Processes and systems in which a portion of the compressed air at the higher pressure is recovered while still at very high pressure to subsequently supply the other blowing stage at a lower pressure are known in the prior art.

Although this is a good energy-saving solution, a significant amount of the energy that is used to produce the compressed air is still wasted, since air that is still highly energized is dispersed into the environment after being reused at the lower pressure level.

SUMMARY OF THE INVENTION

A main purpose of the present invention is to produce an apparatus for drying plastic material to be used in conjunction with blow mold machines used to produce plastic containers so as to achieve a more energy-efficient production process.

Another purpose is to achieve a better integration of the processes performed by single-stage machines used to produce plastic containers, i.e. machines that perform all stages of the production process, starting from plasticizing up to blow molding the end product, to reduce overall consumption, improve machine efficiency, reduce overall dimensions and enhance operative flexibility.

The present invention achieves the purposes described above with an apparatus for drying plastic material for a machine used to produce plastic containers. The apparatus comprises means for recovering compressed vented air obtained from a de-gassing process performed after a blowing process in a container blowing machine, means for heating said air suitable for heating the vented air, means for generating electromagnetic energy suitable for heating the plastic material and the moisture content thereof and for dehumidifying said plastic material, means for evacuating the moisture extracted from said plastic material using the outflow of said vented air.

According to another aspect of the invention, the purposes described above are achieved with a process for drying plastic material for the production of plastic containers performed using the apparatus described above. The process consists of the following steps:
  recovery of compressed vented air from a de-gassing process performed after the blowing process,
  heating of said air,
  heating of the plastic material and the moisture content thereof by means of electromagnetic energy,
  dehumidification of said plastic material using the outflow of said air through the actual plastic material.

At the end of this process the plastic material undergoes the other stages whereby it is transformed into the final plastic container product. Said stages comprise:
  melting, plasticizing and homogenization of the plastic material after drying, injection molding the preforms,
  blowing the preforms, using dehumidified compressed air, to give them the shape of the plastic containers.

The preform molding step may be followed by an intermediate cooling process, with subsequent reheating when the preforms are to be blow molded. This is the case of multi-stage machines. Otherwise the preforms that are still hot from the injection process are transferred directly to the blow machine. This is the case of single-stage machines.

BRIEF DESCRIPTION OF THE DRAWINGS

Further characteristics and advantages of this invention will become clear from the following detailed description of preferred, but not exclusive embodiments of a plastic material drying apparatus, that are merely illustrative and not limitative, with the help of the drawings attached hereto, in which.

DETAILED DESCRIPTION OF PREFERRED EMBODIMENTS OF THE INVENTION

Figure 1A:
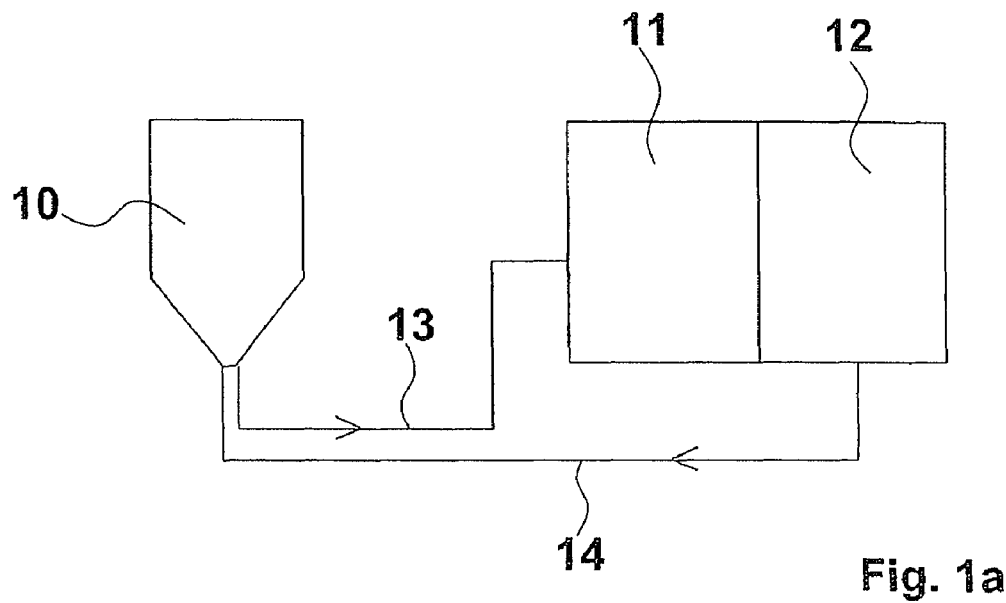
FIG. 1a is a diagram of a single-stage machine with the drying apparatus according to the invention.
Figure 1B:
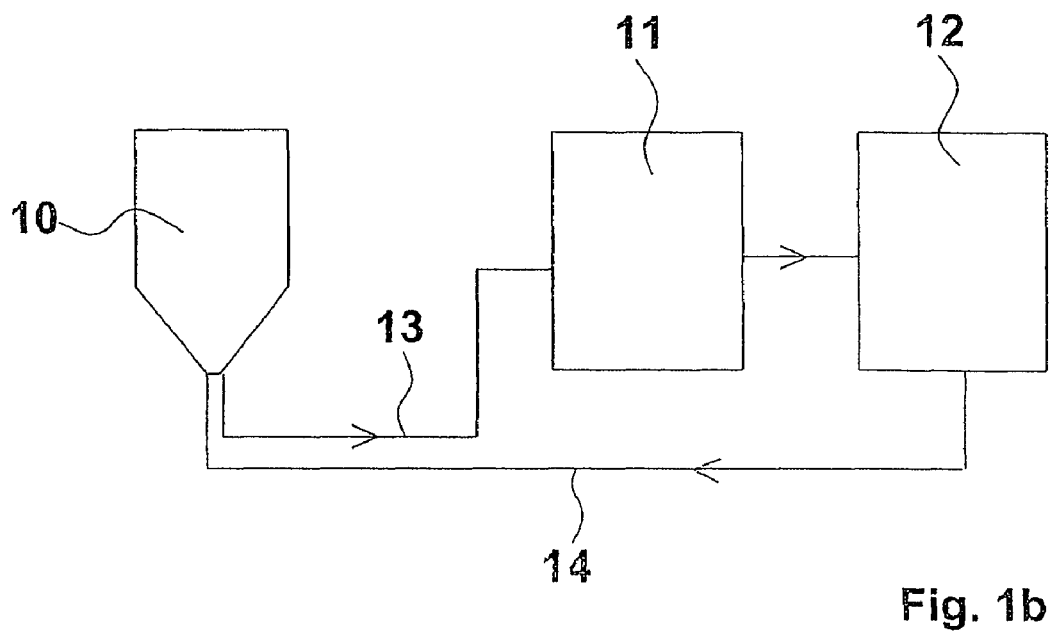
FIG. 1b is a diagram of a multi-stage machine with the drying apparatus according to the invention.

With reference to the diagram in FIG. 1a, a schematic illustration of a machine for producing plastic bottles using a single-stage process, also simply referred to as a single-stage machine, incorporating the plastic material drying apparatus 10 according to the invention is shown. One type of container for which this type of machine is most commonly used are PET bottles, but said machine can also be used to produce other types of plastic containers other than PET containers.

The machine used to produce PET bottles comprises a PET feeding system and a PET granule processing unit that heats the granules to dehumidify the material. This unit, that may in practice consist of a process pipe, is in turn divided into a first preheating part, and a microwave application part that consists of a power unit, a generator, also commonly known as a magnetron, an emitter, a waveguide and a resonance cavity. This portion of the machine performs and controls the use of microwaves to heat the PET and promote the evaporation of the moisture content thereof. The PET is subject to two simultaneous heating processes, namely to a combination of the indirect effect of the heating of the moisture content of the plastic and the direct effect of the action by the microwaves on the dipoles in the molecular chain of the resin.

There is also a system to obtain the forced evacuation of the moisture extracted from the plastic after said heating process. The air used to perform this operation is supplied by the blowing unit 12, through appropriate channels 14. The air used in the bottle blowing stage, described below, comes out of the formed bottles after blowing and is still at a very high pressure with characteristics that are particularly advantageous for being used to dry the PET. The air has in fact already been dehumidified and is thus particularly suitable for evacuating the moisture. This air is usually dry air that has been compressed to a maximum of approximately 40 bar.

Said air is subject to a heating process after leaving the blowing unit 12 and before being fed into the machine's PET drying apparatus or unit 10. The heating process in this stretch brings the air to a temperature of more than approximately 60° C., thus contributing to the preheating of the PET, an effect that is combined with the heating effect of the microwaves.

The portion containing the microwave system is followed by a portion in which the temperature is further raised so that the PET is heated to a temperature of approximately 170° C., in order for it to be fed through channels 13 into the extruder where the material is mixed and homogenized. This increase in temperature can be achieved using vented air heated to a suitable predefined temperature.

When microwave heating systems are used the PET must not be allowed to remain still during heating and must be kept moving continuously from machine startup. One consequence of this is that, when a bottle production cycle starts, the PET is made to pass several times through the extruder before the material is in a stationary operating condition and can be sent to the extruder outlet.

The extruder thus pushes the plasticized PET towards the injection molds 11 for the preform molding process, which is performed in a way that is known in the prior art.

The drying unit 10 incorporates a by-pass channel for recirculating the plastic in the process pipe during the bottle production cycle startup steps. During startup or in any case when the machine starts from a standstill, an auxiliary compressor or a specific connection with the central compressed air system supplies the pneumatic system.

The preforms are then removed from the mold and transferred while still hot and in a semi-plastic state towards the blowing unit 12.

The actual blowing unit is a machine element that is known in the prior art in which stretching and blowing are performed to transform the preforms into bottles with a specific final shape.

The stretch-blow process is of the type known in the field and is not described in further detail here. It is a very common technique in the production of PET bottles that generally consists of two blowing steps at different pressures, the first at a lower pressure and the second at a higher pressure.

After this blowing process, the air is recovered, instead of being dispersed into the environment, and fed into a channel 14 to be sent to the PET drying apparatus 10, as described above.

The machine also incorporates a system for controlling the various constitutive elements and units required to perform all the operations described herein. Advantageously the machine also incorporates a process control and automation supervision system programmed as a function of the product to be made.

Thanks to the characteristics described above, the machine used to produce plastic bottles provided with the plastic drying apparatus 10 according to this invention, for example a single-stage machine, offers a number of advantages over the machines known in the prior art: it consumes less energy and has shorter startup times, when production is interrupted and then resumed again after bringing the machine to a standstill. Finally, overall dimensions are reduced because some of the more bulky devices or components that are normally used to dry the PET in machines in the prior art are no longer required.

A single-stage machine of this type, in which the optimal integration of the drying apparatus according to the invention is achieved, comprises the raw plastic drying unit, a plastic melting, plasticizing and homogenizing unit, a preform injection molding unit, a plastic container blowing unit, a unit in which the compressed air is produced and dehumidified for use in the blowing process in the blowing unit, means for recovering the vented compressed air after the blowing process, means for heating the air suitable for heating the vented air, means for generating electromagnetic energy suitable for heating the resin or raw plastic and for dehumidifying said plastic, means for evacuating the moisture extracted from said plastic using the outflow of said vented air.

The drying apparatus according to the invention may be used in conjunction with machines for producing plastic containers technically known as single-stage machines in the specific field, as described previously. It can also be used in conjunction with machines that produce bottles in several stages and that provide for an interruption in the production cycle between injecting the preforms and blowing the containers, but that still enable the blowing air to be recuperated so that it can be reused in the step that precedes the injection of the preforms.

Figure 2:
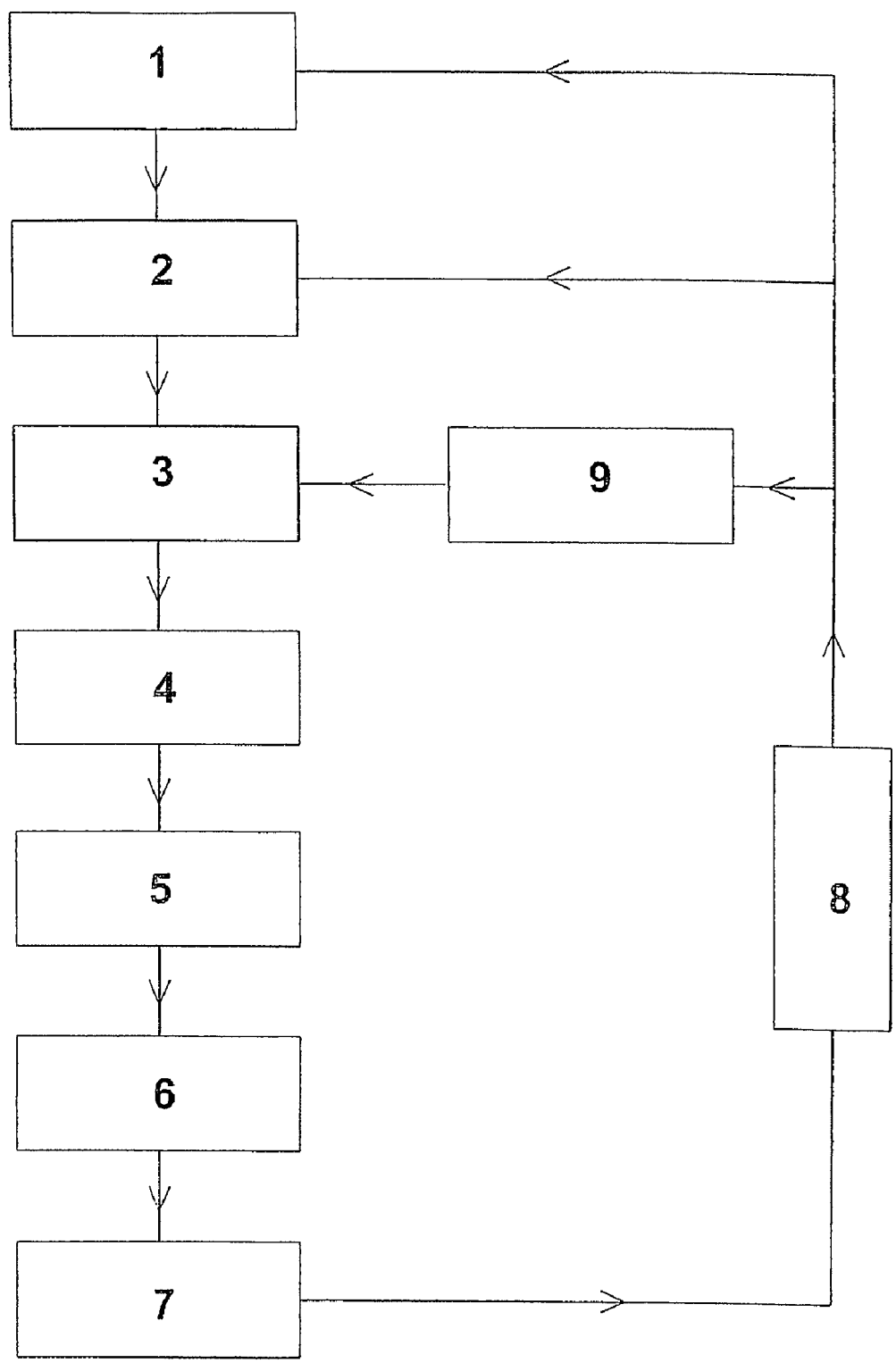
FIG. 2 is a block diagram of the steps in a process to produce plastic containers using the apparatus according to the invention.

FIG. 2 is a block diagram of the different steps of a plastic container production process that includes the drying process performed using the apparatus according to the present invention.

Said process comprises:

a step 1 in which the PET granules are dried, which in turn comprises the preheating and dehumidification process performed by using a combination of a heated air flow and microwaves, a step 2 in which the moisture extracted from the PET is evacuated by means of a heated air flow, a step 3 in which the temperature of the PET is increased again, or refined, so as to achieve the ideal conditions for extrusion, a step 4 in which the PET is extruded, comprising the melting, plasticizing and homogenizing of the plastic material, an injection molding step 5 to obtain the preforms, a blowing step 6 to transform the preforms into containers, a step 7 in which the vented air is recovered after the blowing process, a step 8 in which the vented air is heated for subsequent reuse of this hot air in steps 1, 2 and, after a further heating step 9 also in step 3.

Steps 1, 2 and 3 may be performed simultaneously in a single monobloc drying apparatus or separately in several devices all arranged upstream of the extruder.

The invention claimed is:

1. An apparatus for processing plastic material used to produce a plastic container, said apparatus comprising
   a drying unit that is configured to heat the plastic material and moisture contained therein and to dehumidify said plastic material;
   an injection mold unit that is configured to perform a molding process;
   a blowing unit that is configured to blow the plastic material, to form a plastic container, and to perform a de-gassing process;
   means a first channel that is configured to recover compressed vented air obtained from the de-gassing process performed after the blowing and forming the plastic material into the plastic container;
   means a heating unit that is configured to heat the recovered compressed vented air; and
   means
   means a second channel that is configured to feed said heated recovered compressed vented air to the plastic material for evacuating the moisture extracted from said plastic material.

2. The apparatus according to claim 1, wherein the drying unit comprise a microwave generator.

3. The apparatus according to claim 1, wherein the blowing unit comprises one or more blow molds for containers.

4. The apparatus according to claim 3, wherein the blowing unit is configured to perform a blowing process at two different air pressures: a first pressure is lower than a second pressure.

5. The apparatus according to claim 1, wherein the apparatus is suitable for use with a machine used to produce PET containers.

6. A process for processing plastic material used to produce plastic containers, comprising the following steps:
   providing the plastic material;
   drying the plastic material;
   forming the plastic container with the plastic material by a blowing process;
   degassing the container after the blowing process;
   recovering compressed vented air from the de-gassing process;
   heating said recovered air; and
   recycling said heated recovered air to dry the plastic material;
   wherein the drying the plastic material with the heated recovered air comprises:
   heating the plastic material and moisture contained therein; and
   dehumidificating said plastic material using said heated recovered air.

7. The process according to claim 6 wherein a flow of vented air, after the dehumidification, is heated again to bring the plastic material to suitable temperatures for extrusion.

8. The process according to claim 7 wherein the plastic material is used in a form of granules.

9. The process according to claim 6, wherein in said drying the plastic material a microwave generator is utilized to heat the plastic material and promote evacuation of moisture content thereof.

10. The process according to claim 6, wherein said heated recovered air that is used to dehumidify said plastic material is dry air compressed to a maximum of approximately 40 bar.

11. The process according to claim 6, wherein in said heating the recovered air the recovered air is heated to a temperature of more than approximately 60° C.

12. The process according to claim 6, wherein during and/or after said drying the plastic material the plastic material is heated to a temperature of approximately 170° C.

* * * * *